Patented Mar. 17, 1953

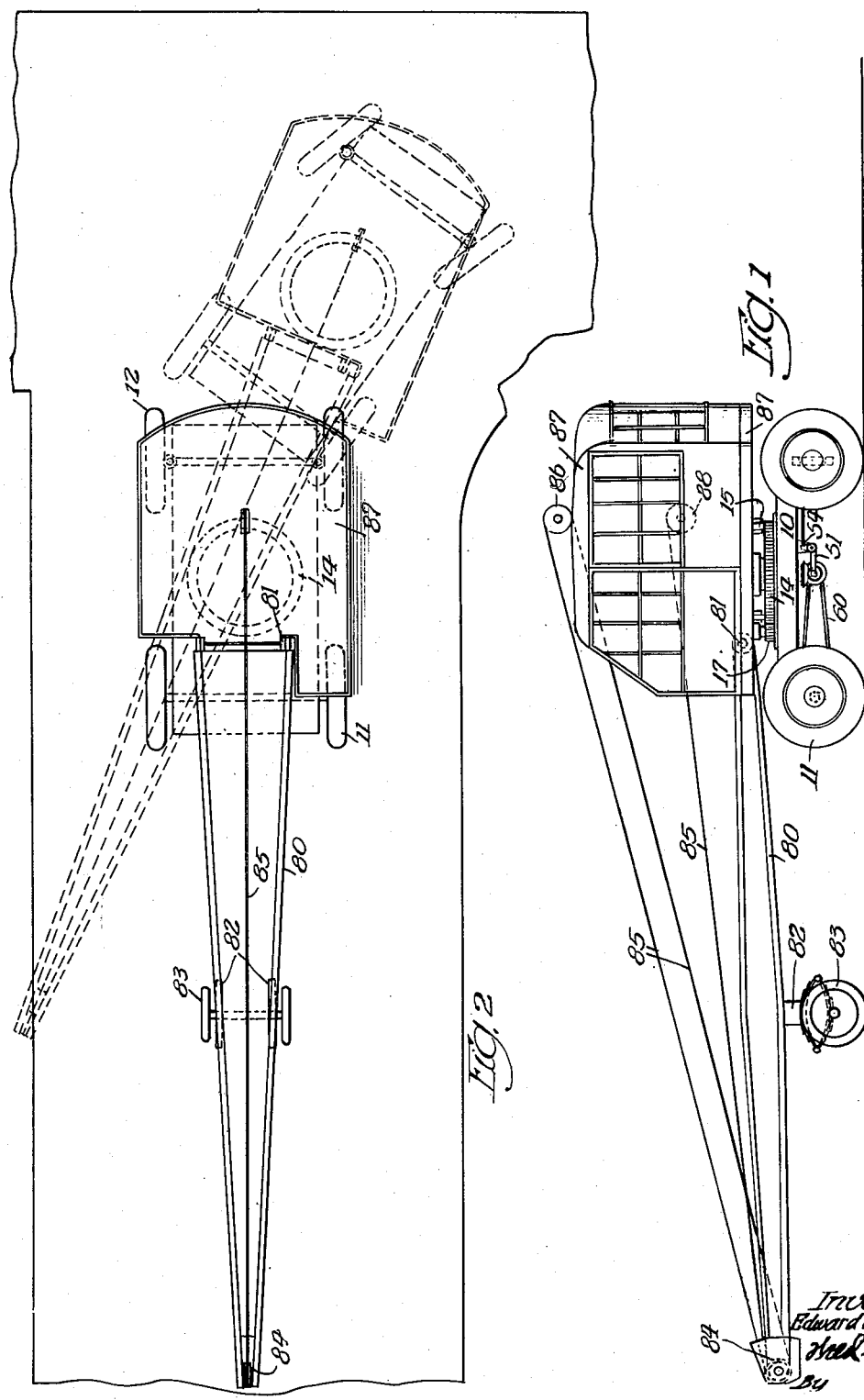

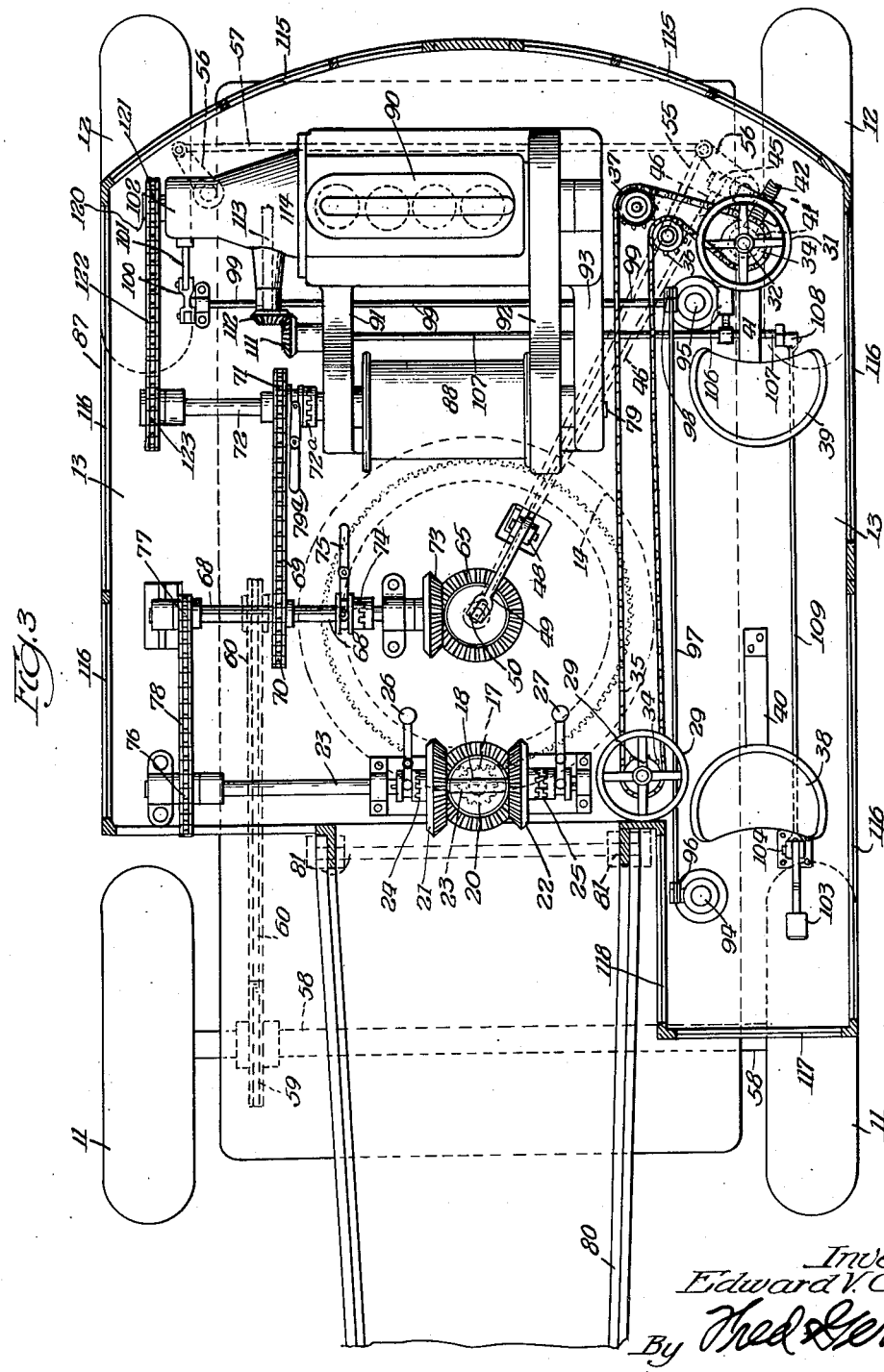

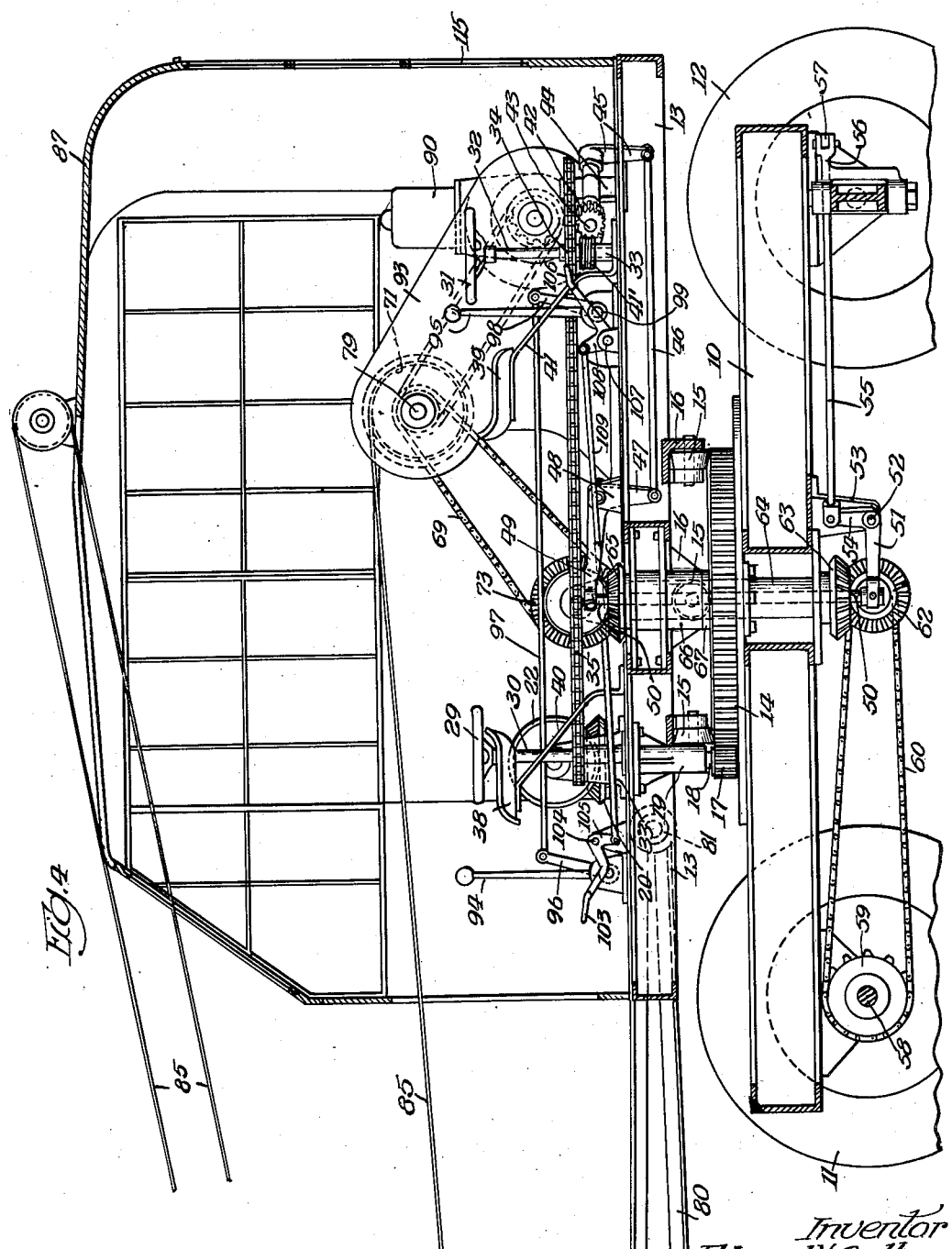

2,631,737

UNITED STATES PATENT OFFICE 2,631,737

HIGHWAY CRANE

Edward V. Cullen, Chicago, Ill., assignor to The Cullen-Friestedt Company, Chicago, Ill., a corporation of Illinois Application November 17, 1945, Serial No. 629,288

12 Claims. (Cl. 212—38)

This invention relates in general to a highway crane and is more particularly described as a wheel supported cab with a removable trailer axle located near the center of the extending boom in supporting it for transporting it along the highway. The operating cab has a controlling position at the front or boom end to operate the crane in the conventional manner and it also has a control position at the rear of the cab which permits an operator to drive the cab backwards with the boom trailing.

Cranes of this type are usually controlled from one point at the front of the cab. The result is that when travelling on a highway the boom is suspended by the boom cables and is located forward of the operating cab. When making a sharp turn with the rotating deck and the under frame locked together, which is necessary when no trailer axle is used under the boom, the boom will make a wide sweep outwardly into the reverse traffic lane which endangers oncoming vehicles. When approaching an intersection with the boom disposed forwardly, it will project a considerable distance into the cross traffic lane before the operator has clear vision to see the approaching traffic. This also constitutes a dangerous condition.

In view of the above dangerous conditions it is sometimes necessary to remove the boom entirely and to haul it on a truck in order to operate the crane over highways and streets. In the present invention by having two controlling positions the operator may be located at the rear of the cab when the crane is running backward, where he has unobstructed visibility, the boom resting on the trailer wheels drawn behind the crane itself so that the above objections would not exist, and the trailing boom does not constitute a danger or menace to the other traffic in adjacent lanes.

An important object of the invention is to provide a highway crane with propelling and drive mechanism operable from two positions in the control cab and arranged for an operator facing in opposite directions.

A further object of the invention is to provide a controlling highway cab for cranes and the like having propelling drive mechanism with dual controls for front and rear operation for steering by means of the front wheels with dual gear shift mechanism and dual engine clutch control.

A further object of the invention is to provide a highway crane in which the operator can turn steering wheels of the under frame to guide it in turning a corner and with a relatively rotating deck guided by the boom trailer wheels which follow their natural curve preventing the boom from swinging immediately into the reverse traffic lane.

A further object of the invention is to provide a highway crane having control means for normally controlling the crane with the operator facing forwardly, and with similar means for controlling the rearward movement of the crane with the operator facing rearwardly.

A further object of the invention is to provide dual control means for a highway crane operated from opposite positions at the front and rear of the crane and comprising a single engine and steering means operated thereby.

Another object of the invention is to provide a highway crane having dual control for the steering and operating means which is generally of new and improved construction characterized by simplicity of design as well as ease and facility of assembly and operation.

Other objects of the invention and various advantages and characteristics of the present highway crane will be apparent from a consideration of the following detailed description.

The invention consists in the several, novel features which are hereinafter described and more particularly defined by the claims at the conclusion hereof.

In the drawings which accompany and form a part of this specification or disclosure, and in which like letters and numerals of reference denote corresponding parts throughout the several views:

Figure 1 is a side elevation of a highway crane in accordance with this invention, the boom extending forwardly from the operating cab and supported by a wheeled trailer;

Figure 2 is a plan view of the crane shown in Figure 1 illustrating in broken outline the differential position of the wheeled under frame and the cab body in turning a corner;

Figure 3 is a plan view illustrating the operation and dual controlling mechanism for operating the crane and driving it in opposite directions; and Figure 4 is a side elevation of the mechanism shown in Figure 3, some of the parts being shown in section.

The method of control of the boom in this invention is similar to the conventional highway crane type except that an additional reverse driving seat and position and controls are provided by which it is possible to drive the crane more rapidly, more conveniently and more safely, in a reverse or rearward direction as compared with the crane operating position.

Referring now more particularly to the drawings, the crane is mounted upon a wheeled truck having a running gear frame 10 mounted upon driving wheels 11 at one end and pivotally mounted steering wheels 12 at the other end.

The crane cab has a floor frame 13 centrally supported upon the running gear frame 10 by means of a circular externally toothed gear 14 mounted at the top of the frame 10 with rollers 15 supported in brackets 16 attached to the underside of the floor frame 13 and bearing at intervals upon the upper inclined and untoothed edge of the gear 14. In order to rotate the cab with respect to the running gear frame, a pinion 17 is mounted on the lower end of a shaft 18 in engagement with the teeth of the gear 14, the shaft being held in fixed position by a supporting bearing 19 secured to the floor frame 13 so that when the pinion 17 is turned it will cause the cab to be rotated with respect to the frame 10.

At the upper end of shaft 18 is a bevel pinion 20 at the upper side of the floor frame 13 meshing with opposite bevel gears 21 and 22 mounted for free rotation upon a driving shaft 23 and having movable clutches 24 and 25 operated by levers 26 and 27 respectively for connecting the shaft 18 and its pinion 17 for opposite rotation in a well-known manner, the shaft 23 being driven in a constant direction.

A steering wheel 29, mounted at the upper end of a shaft 30, is located at the forward or operating end of the cab, and at the rear or driving end of the cab is a corresponding steering wheel 31 secured to a shaft 32 mounted at the bottom in a supporting bearing 33 attached to the upper side of the floor frame 13. In order to connect the two wheels 29 and 31 each one has a sprocket 34 engaged by a driving chain 35, the chain passing around sprockets 36 and 37 so that the rotation of one wheel will cause a similar rotation of the other.

Driving seats 38 and 39 are reversed in direction and located at the front and rear of the cab respectively where they are supported at the upper ends of arms 40 and 41 secured to the upper deck of the floor frame 13. Connected with one of the steering shafts as 32 is a worm-gear 41' meshing with a worm pinion 42 mounted on a shaft 43 in brackets 44 and having a depending arm 45 connected thereto for rocking motion depending upon the movement of the gear 42. Pivotally connected to the free end of arm 45 is a link 46 pivotally connected to one end of a lever 47 in the form of a bell crank pivotally mounted intermediate its ends upon a bracket 48 at the top of the floor frame 13 and having the extremity of its other arm 49 connected to the upper end of a shaft 50 which extends vertically downward centrally of the supporting gear 14.

The lower end of the shaft 50 extends through and below the wheel supported frame 10 where it is pivotally engaged by one end 51 of a lever in the form of a bell crank mounted intermediate its ends upon a shaft 52 supported by a bracket 53 depending from the lower side of the frame 10 and the other arm 54 of the lever being pivotally connected at its extremity with one end of a link 55, the other end of which is pivotally connected to a steering arm 56 of one of the steering wheels 12, the steering movement being communicated to the other steering wheel by a cross rod 57, connected to the steering arm 56 of the opposite front wheels.

Thus the rotation of the steering wheels 29 and 31 will effect the independent movement of the wheels 12 for steering regardless of the position of the pinion 17 which moves the floor frame of the cab relative to the running gear frame 10.

For moving and driving the running gear frame the rear wheels 11 are connected by an axle 58 upon which is a driving sprocket 59 with a driving chain 60 in engagement therewith and also in engagement with a sprocket mounted on a shaft (not shown) which is below the frame 10 centered with and secured to a bevel gear 62 suitably mounted and meshing with a bevel driving gear 63 centrally located below the running gear frame 10 and centrally located with respect to the gear 14. Preferably the bevel driving gear 63 is secured to a hollow driving sleeve 64 through which the vertical steering shaft 50 extends, the sleeve being suitably mounted and extending upwardly through the gear 14 and through the floor frame 13 of the cab where it is secured to a bevel gear 65 mounted on a sleeve 66 extending downwardly through the floor frame and supported by a bearing block 67 carried by the lower running gear frame. Thus, the gears 63 and 65 are rotatable together and the steering mechanism extends centrally downward through the sleeve 64 which connects them.

At the top of the floor frame 13 is a cross shaft 68 for driving the running gear frame or for rotating the operating cab in either direction with respect to the running gear frame. This shaft receives power from the engine through a sprocket chain 69 which engages a sprocket wheel 70 tightly secured on shaft 68, the other end of the chain being mounted on a sprocket 71 at one end of the engine driven shaft 72.

At one end of the shaft 68 is a bevel gear 73 loose thereon and meshing with bevel gear 65 and a clutch mechanism 74 is operated by a clutch lever 75 to connect the gear 73 to the shaft 68 and thus to transmit motion to the rear driving wheels 11 through the hollow sleeve 64.

There is also a fixed driving connection between shaft 68 and driving shaft 23, this connection comprising a sprocket 76 secured to shaft 23, a sprocket 77 secured to shaft 68, and a driving chain 78 connecting the sprockets. With this construction the pinion 17 may be operated in opposite directions to engage the gear 14 at the top of the running gear frame regardless of the direction of rotation of the shaft 68 since there are two opposite clutch connections 24 and 25 in connection with the shaft 23 for connecting the driving shaft 18 thereto. Also with this arrangement the control cab may be operated in either direction with respect to the running gear frame independently of the driving connection with the drive wheels 11 of the running gear frame, and the latter may be operated independently of the mechanism for turning the operating cab relative to the running gear frame.

Extending forwardly from the operating cab is a crane boom 80 suitably mounted to swing on pivots 81 carried by the cab and having a removable trailer 82 with wheels 83 for supporting the boom intermediate the ends thereof. The trailer may be located near the outer end of the boom rather than near the center if desired according to highway conditions and the trailer may be of various constructions either two-wheeled as shown or with a caster arrangement having one wheel only. At the outer end of the boom is a supporting pulley 84 having various lines of a cable 85 extending thereover and over a pulley or sheave 86 at the top of the upwardly extending cab housing structure 87.

The lower end of the cable 85 extends inwardly at the front of the cab housing where it is wound upon a drum 88 mounted upon a shaft 79 which is connected to the winding drum 88 in any well known manner for raising the boom, the boom being lowered by its own weight and by the weight of the material lifted.

To connect the winding drum 88 for winding movement, a clutch 72a is mounted at one end of the driving shaft 72 in position to engage the drum shaft 79, the clutch being operated by a lever 79a to move the clutch into or out of engaging position. With this construction, the drum 88 may be driven or freed from the driving connection by the operation of the clutch without affecting the driving relation between the driving shaft 72 and the shaft 68.

At the rear of the drum with its driving shaft parallel with the driving shaft 72 is an engine 90 having supports 91 and 92 at opposite ends for the winding drum 88 and the driving shaft 72.

Dual controlling of the engine from the front and rear positions and the two seats 38 and 39 respectively is accomplished by double and reverse clutch and gear shift connections extending to the motor.

The gear shifting control comprises an operating lever 94 in the front position and an operating lever 95 in the rear position. The former is connected by an arm 96 which swings with the lever, to a link 97 pivoted at one end to the free end of the arm and pivoted at the other end to an arm 98 to which the other gear shift lever 95 is also connected. The arm 98 and lever 95 are connected to a cross shaft 99 extending to the opposite end of the engine where arm 100 is secured having a link 101 extending into gear shift mechanism 102 at this end of the engine 90. The particular form of this gear shifting mechanism is not material to this invention and may be of any suitable form or construction.

Extending from the gear shift mechanism 102 is a stub shaft 120 upon which a sprocket 121 is mounted for receiving a driving chain 122 which extends around a sprocket 123 mounted on the engine driving shaft 72. With this construction and arrangement, the power obtained from the engine is transmitted through the gear shift mechanism 102 and this power may be reversed or the speed changed in either direction in accordance with the gear shift mechanism which is employed. Driving shaft 72 may thus be rotated in opposite directions and the speed changed in either direction.

A reversely operating clutch mechanism comprises a clutch pedal 103 in the forward position mounted upon a pivot 104 and having an arm 105 depending therefrom. For the opposite or rear position, a pedal 106 is mounted upon a shaft 107 and has an operating arm 108 extending upwardly therefrom. These oppositely extending arms 105 and 108 are connected by a link 109 pivoted to the ends of the arms for operating them simultaneously. The shaft 107 connected to the rear operating pedal, extends transversely of the cab, and on its opposite end is a bevel gear 111 connected to a bevel gear 112 mounted on a shaft 113 extending within a clutch casing 114 at the end of the engine 90 for engagement with engine clutch mechanism which may be of any suitable construction. If desired, the opposite clutch pedals 103 and 106 may be mounted at the same relative side of their driving seats 38 and 39 by suitably inclining the connecting link 109, and in a similar manner the gear shift levers 94 and 95 may be mounted at the same relative side of their seats 38 and 39 by correspondingly crossing the connecting link 97. This is relatively unimportant since the clutch pedals may be operated by one foot or the other and the gear shift levers may be correspondingly moved by one hand or the other, but it is material that the clutch pedals be moved in the same direction to effect the clutching relation and the gear shift levers be shifted in the same relative position to effect the gear shifting relation for both of the front and rear driving positions.

With this construction, the crane may be operated and controlled in a normal manner from the front seat or position, the boom raised by power, the running gear frame advanced or withdrawn, steered and driven at different speeds from the front position represented by seat 38, and the control cab may be rotated relatively to the running gear frame in either direction.

When it is desired to move the crane upon a highway and for the purpose of driving it more rapidly, more safely and with greater ease and visibility, the driving position is reversed, that is, the operator assumes the relatively rear driving seat 39 where the driving controls are repeated for the purpose of moving the crane as a vehicle upon the highway, but the controls for the crane are not repeated and are not operated from the so-called rear position. In this rear or highway driving position, the crane boom is supported by the trailer 82, and the crane boom being pivoted to the controlling cab swings with it and may be differentially swung with respect to the running gear frame as represented in Figure 1 for making a sharp turn or for turning a corner. The ordinary highway driving, however, is accomplished more readily by having the operator in the rear driving seat 39 where good visibility is provided in the controller cab in all directions by rear windows 115, in front of the rear driving position, side windows 116 and front cab windows 117 and 118.

By reversing the controls in this manner, it would be possible to have the operator turn around in his control position at the front of the cab either in a standing position or to make the seat 38 reversible, preferably reversing the controls as herein described and designing the cab in such a manner that he will have clear 360 degree visibility which would be a considerably more advantageous arrangement than the present conventional manner of driving cranes. By having the front and rear controls separate and separated, there is an advantage in having the control position in the location of greatest visibility for operating the crane and at a separate operating position for driving the crane upon a highway. With this rear highway driving position, the boom itself does not interfere with the forward driving visibility and it presents none of the difficulties of driving a vehicle with a considerable projection at the front of the vehicle where it is not usually expected by other drivers, the boom being located at the rear in a trailing position.

The invention is not to be understood as restricted to the details set forth since these may be modified within the scope of the appended claims without departing from the spirit and scope of the invention.

Having thus described the invention, what I claim as new and desire to secure by Letters Patent is:

1. In a highway crane, a wheeled frame having driving wheels at one end and steering wheels at the other, a control cab above the wheeled frame, a mounting for turning the cab about a vertical axis comprising a gear secured to the wheeled frame upon which the cab is rotatable, a pinion mounted in the cab and engaging the gear, a boom pivoted in the cab and extending forwardly therefrom, an engine mounted in the cab and having means for connecting it to said pinion and to raise and lower the boom relative to the ground, dual control stations for the engine at the front and rear of the cab, each control station facing outwardly at the end so that the operator may also face outwardly of the frame in driving from either end and each station having a steering wheel, a clutch pedal and a gear shift lever, means extending from the pedal and lever to the engine for controlling the speed and the driving connection of the engine, a driving tube extending centrally through the cab mounting and having a connection with the driving wheels, a connection from the steering wheels at the front and rear control stations to the steering wheels of the wheeled frame comprising a shaft extending centrally through the driving tube, and a wheeled support for the boom intermediate the ends thereof for supporting the boom upon the ground in its lowered position.

2. A highway crane having a wheel mounted frame with driving wheels at one end and steering wheels at the other, a control cab with a mounting upon the wheeled frame upon which it is pivoted for horizontal rotation, said mounting comprising a gear secured to the wheeled frame and a pinion meshing therewith carried by the cab, a boom pivoted to the cab to swing in a vertical direction, an engine mounted in the cab having a driving connection with the said driving wheels, means at one end of the cab for connecting the engine to the pinion for rotating the cab relative to the frame in either direction, means at the same end of the cab for connecting the engine to raise and lower the boom, a wheeled truck disposed intermediate the ends of the boom for supporting it upon the ground in its lowered position, a driving station in the cab facing outwardly at the end opposite the boom having means for controlling the speed and driving connection of the crane and also having a steering wheel with connections therefrom extending through the mounting between the control cab and the wheel supported frame and extending to the steering wheels of the wheel mounted frame.

3. A highway crane having a controlling cab with a boom extending forwardly therefrom and including an engine for raising and lowering the boom, a wheeled frame having driving and steering wheels and a mounting in the frame for permitting rotation of the cab in a horizontal plane, means extending to the engine for rotating the cab with respect to the wheeled frame, an independent wheeled support intermediate the ends of the boom for supporting it from the ground in its lowered position, the wheeled frame having driving wheels and means for operating them from the engine, and a highway driving station in the cab facing outwardly at the end opposite the boom having means for controlling the speed and direction of the crane and also having steering means with connections extending to the steering wheels of the wheel mounted frame whereby the wheel supported frame and the cab may be differentially rotated by the engine to keep the boom in trailing alignment when the wheeled frame is steered to turn it from a path on a highway.

4. A highway crane having a controlling cab with a boom extending forwardly therefrom and means including an engine for raising and lowering the boom, a wheeled support for the boom intermediate the ends thereof for supporting the boom from the ground in its lowered position, a wheeled frame upon which the controlling cab is rotatably mounted about a vertical pivot, the frame having driving wheels and steering wheels, means operated by the engine for rotating the cab upon the wheeled frame, a pair of outwardly facing motor control stations at opposite ends of the cab, means for similarly steering the cab for forward or rearward movement from each of the two stations, dual controls for the engine comprising gear shift and clutch means at each of the stations for controlling the speed imparted to the driving wheels of the wheel supported frame whereby the wheel supported frame may be steered by the operator facing outwardly at either end of the frame from either station and the cab may be rotated relatively to the wheel supported frame to afford a differential movement between the pivoted boom and the wheel supported frame to facilitate making a sharp turn without throwing the boom into an adjacent pathway.

5. A highway crane having a wheel supported frame with a pivotally mounted control cab, the frame having driving wheels and steering wheels, operating means in the cab including an engine, means to connect the engine for turning the cab independently of the movement of the wheel supported frame, means forming a pair of oppositely and outwardly facing motor control stations at the front and rear of the cab so that the frame can be operated from the station at either end of the cab, interconnected means for similarly steering the frame by its steering wheels for forward and rearward movement from the two stations, and dual interconnected controls for the engine comprising gear shift and clutch means at each of the stations for controlling the operation of the engine by similar movements of said controls.

6. A vehicle highway crane with a boom pivoted to swing at one end and having driving wheels at one end and steering wheels at the other end, an engine on the vehicle having driving connections with the driving wheels, means at one end of the vehicle for connecting the same engine in a separate operational relation with respect to the boom pivoted on the vehicle, an engine operating means and controlling means therefor disposed oppositely and outwardly at both ends of the vehicle, and vehicle steering means for said steering wheels extending to both ends of the vehicle, the engine operating means and the steering and controlling means being adapted for separately driving and steering the vehicle and controlling the said engine with the operator facing outwardly at either end of the vehicle.

7. A highway crane having a controlling cab with a boom extending forwardly therefrom and means including an engine mounted in the cab for raising and lowering the boom, a wheeled frame having driving wheels and steering wheels, the cab and frame having means for connecting them to the motor for relative turning movement about a vertical axis, control means for the engine in each of opposite outwardly facing front and rear stations in the control cab so that the operator controls the movement of the wheeled frame from either station in an outwardly facing position at that end, dual interconnected control means for the engine extending from the control stations and connections from the engine to the wheels for driving the wheeled frame, and steering means also located at each of the control stations and extending to the wheels in the frame for steering from either station.

8. A highway crane comprising a wheel supported frame and a control cab, the frame supporting wheels being driving wheels and steering wheels, means connecting the cab for rotary movement upon the wheeled frame, a boom pivoted to the cab, means in the cab including an engine for raising and lowering the boom and for moving the cab with respect to the wheel supported frame, means forming a pair of oppositely and outwardly facing motor control stations at the front and rear of the cab so that the operator controls the movement of the wheeled frame from either station in an outwardly facing position at that end of the cab, said last means including interconnected hand steering wheels in the cab on the wheeled frame, means for similarly controlling said engine for forward and rearward operation of the driving wheels from the two stations, and said interconnected steering means extending from each of the control stations centrally through the cab connecting means on the wheeled frame to the frame steering wheels.

9. A highway vehicle comprising a controlling cab and a wheeled frame therefor, means for connecting the cab for relatively swinging movement on the frame about a vertical pivot, the wheeled frame having driving wheels and steering wheels, a driving connection extending to the driving wheels through the vertical pivot, an engine mounted upon the cab connected with said driving connection in front and rear oppositely and outwardly disposed end stations in the control cab having means in each station for controlling the engine operation so that an operator controls the movement of the wheeled frame from either station when located in an outwardly facing position at that end of the cab, and steering means at the control stations with connections extending to the steering wheels through the pivotal mounting for controlling the steering of the frame in opposite directions.

10. In a highway vehicle, a wheel mounted frame having driving wheels and steering wheels, a controlling cab centrally mounted for rotation upon the frame, a boom pivoted to the controlling cab and extending forwardly therefrom, an engine mounted upon the cab for raising and lowering the boom, means operated by the engine for rotating the cab upon the wheeled frame, means forming a pair of driving stations facing outwardly at the ends of the frame and extending oppositely with respect to each other and having dual controls at the stations adapted to operate the engine from either station with the operator facing outwardly from the station at that end of the frame, one of said dual controls having connections extending through the central mounting of the cab to the lower wheeled frame and connected to the wheels for steering, a driving connection from the engine through the central mounting to the driving wheels of the wheel supported frame, and the dual controls being similarly located in the opposite driving stations for controlling the speed and direction of the engine.

11. A highway crane having a wheel mounted frame with wheels for steering it, a controlling cab with a central mounting for rotating it horizontally upon the frame, a boom pivoted to the controlling cab and extending forwardly therefrom, an engine mounted upon the cab having connected means for rotating the cab upon the wheeled frame and other connected means for raising and lowering the boom, a driving connection from the engine for the wheeled frame comprising a driving tube located centrally of the mounting between the cab and the wheeled frame, dual controls for the engine comprising gear shift and clutch means at front and rear ends of the cab disposed so that the operator thereof faces outwardly therefrom when controlling the engine and steering the frame and the crane from that end of the cab, dual steering means for the wheel supported frame also located at the front and rear ends of the cab and having a common shaft extending through the central driving tube and connected with the steering wheels of the wheeled frame.

12. A highway vehicle crane having a pivoted raisable extending boom and means including an engine for operating it, a wheel supported cab and means comprising a pair of wheels for driving the cab in opposite directions, wheeled means for separately supporting the free end of the boom in its lowered position at a distance from the cab, front and rear outwardly facing driving stations in the cab with connected control means for the engine and having dual means in the stations connected for controlling the speed and direction of the engine whereby the operator may face outwardly at the end of the frame in driving from either station, and controlling means at the front and rear stations and connections from them to the engine to operate it for raising and lowering the boom at one station and means to connect the engine for driving the vehicle with the free end of the boom supported by said wheeled means controlled from either station.

EDWARD V. CULLEN.

REFERENCES CITED

The following references are of record in the file of this patent:

UNITED STATES PATENTS

| Number | Name | Date |
| --- | --- | --- |
| 679,840 | Graham | Aug. 6, 1901 |
| 1,100,080 | King et al. | June 16, 1914 |
| 1,267,422 | King et al. | May 28, 1918 |
| 1,274,978 | Bishop | Aug. 6, 1918 |
| 1,408,263 | Brun | Feb. 28, 1922 |
| 1,412,944 | Kletke | Apr. 18, 1922 |
| 1,672,212 | Hale | June 5, 1928 |
| 1,760,130 | Forrest | May 27, 1930 |
| 1,940,690 | Moore | Dec. 26, 1933 |
| 2,325,731 | Arentzen et al. | Aug. 3, 1943 |
| 2,343,800 | Rauch | Mar. 7, 1944 |
| 2,358,236 | Lee | Sept. 12, 1944 |
| 2,465,508 | Barnhart | Mar. 29, 1949 |

FOREIGN PATENTS

| Number | Country | Date |
| --- | --- | --- |
| 21,944 of 1914 | Great Britain | Nov. 3, 1914 |
| 292,895 | Great Britain | June 28, 1928 |
| 661,369 | France | Mar. 4, 1929 |